J. BOLF.
ANIMAL CATCHER.
APPLICATION FILED APR. 12, 1922.
1,436,473.
Patented Nov. 21, 1922.
Fig. 1.
Fig. 2.
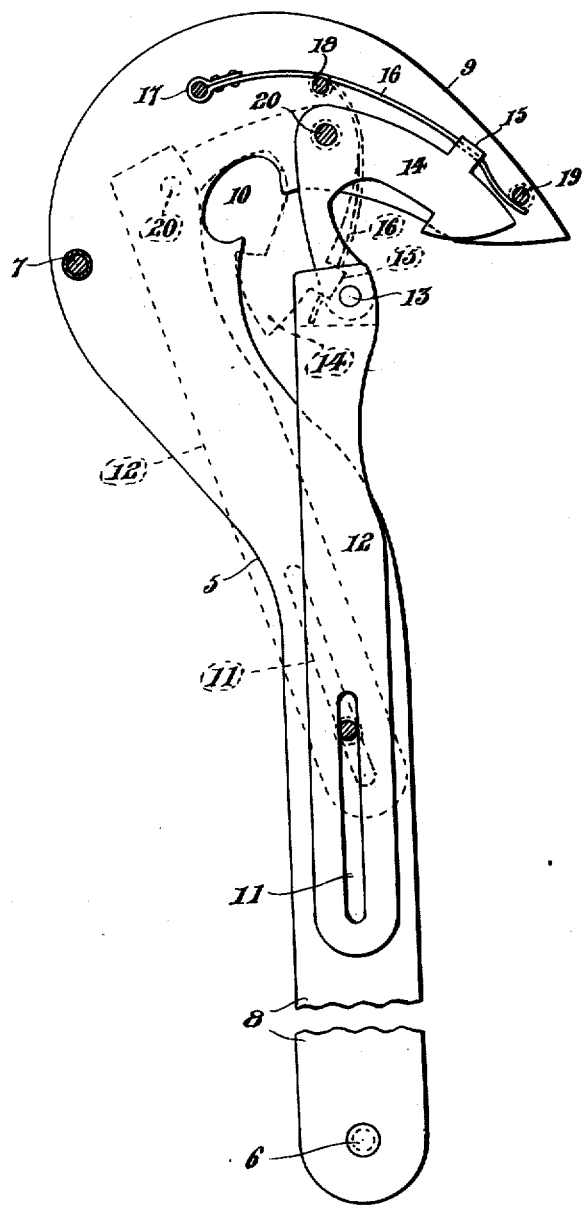
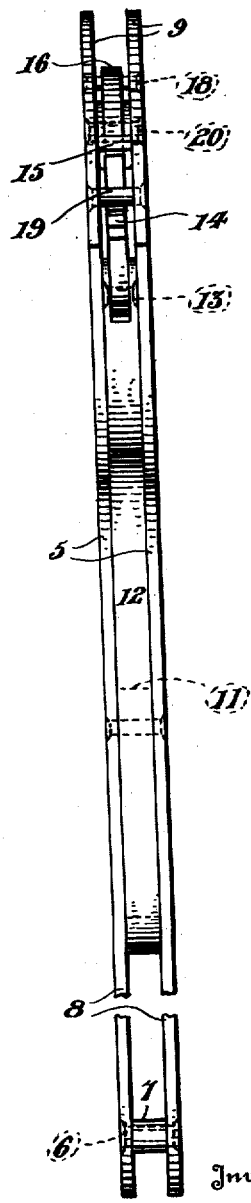
Inventor
John Bolf
By F. K. Bryant.
Attorney Patented Nov. 21, 1922.

1,436,473

UNITED STATES PATENT OFFICE.

JOHN BOLF, OF MILES, TEXAS.

ANIMAL CATCHER.

Application filed April 12, 1922. Serial No. 551,898.

*To all whom it may concern:*

Be it known that I, JOHN BOLF, a citizen of the United States of America, residing at Miles, in the county of Runnels and State of Texas, have invented certain new and useful Improvements in Animal Catchers, of which the following is a specification.

This invention relates to certain new and useful improvements in animal catchers, generally adaptable for the catching of animals in farms or the like, and particularly useful in the catching of fowl.

The primary object of the invention is to provide a generally improved and simplified form of animal catching device of that type wherein the device is adapted to be engaged with the leg of the animal to be caught.

Another object of the invention is to provide an animal catching device involving a handle member having a notch adapted to receive the leg of the animal and associated with a member having a pair of arms, one adapted to be operated by engagement with the animal's leg for moving to permit the animal's leg to enter said notch and for swinging the other arm into position for closing the entrance to said notch.

Still another object of the invention is to provide yieldable means to normally hold the arm provided member in inoperative position ready for catching the animal, the arrangement being such that as long as a pull is exerted upon the device the entrance to the notch will be closed so that the animal will be effectively held as long as this pull upon the device is maintained.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views.

Figure 1 is a longitudinal sectional view with one of the handle forming plates removed, of the preferred form of animal catcher constructed in accordance with the present invention, the normal position of the parts being indicated in full lines and the position of the parts when the animal is caught being denoted by dotted lines, and Figure 2 is a front elevational view of the device shown in Fig. 1.

Referring more in detail to the several views, the present invention preferably embodies a handle member of hook shape and composed of a pair of similarly formed plates 5 disposed in side by side spaced relation and effectively held parallel connected with each other by means of transverse rivets 6 or the like passing through the plates at desired points and some having spacing sleeves 7 thereon for maintaining the spaced relation of the plates. These plates involve a straight shank portion 8 and an end hook member 9, the hook members being notched at their inner edges as at 10 for providing a notch receiving place for the animal's leg as will presently become apparent. One of the rivets connecting the shank members 8 is not provided with a spacing sleeve and extends through an elongated longitudinal slot 11 in a slide rod 12 which is loosely disposed between the plate members 5; the slot 11 being provided at the inner end of the slide bar 12 and the latter being pivotally attached at its outer or other end as at 13 to one arm of a member 14 of substantially bell-crank formation, said member 14 having its other arm attached near its free end as at 15 to the free end portion of a leaf spring 16 which has its other end anchored as at 17 on one of the rivets directly outwardly of the notch 10. In order to resist turning of the spring 16 on the rivet mounting of the same as at 17, the same overlies another rivet between its ends as at 18 and underlies still another rivet as at 19 at its extreme free end. The member 14 is pivoted at the juncture of its two arms as at 20 upon one of the rivets located inwardly of the spring 16 and to that side of the notch 10 which is nearest the open portion of the hook members. The normal position of the parts is such that the slide bar 12 and one arm of the member 14 normally extends in longitudinal alinement across the entrance to the hook-shaped members 9 at the open side of the notch 10 and the other arm of the member 14 is positioned between the free end portions of the hook-shaped members 9 so that when the implement is hooked into engagement with the animal's leg, the first named arm will be engaged by said leg and when a pull is exerted upon the device the member 14 is caused to swing against the action of the spring 16 to permit the leg of the animal to enter the notch 10, the position of the parts when swung being denoted by dotted lines in Fig. 1. When this takes place the free arm of the member 14 effectively closes the entrance to the notch 10 and prevents the animal from escaping as long as a pull is exerted upon the implement. When the animal has been caught by the user of the implement, the pull upon the latter may be released and the parts will be returned to their normal full line position of Fig. 1 by means of the spring 16. The function of the slide bar 12 is to prevent the animal's leg from being caught between the arm of the member 14 connected thereto and the hook member 9 of each plate 5 so as to insure the animal's leg being directed between the two arms of the member 14 and so kept until the leg of the animal is directed into the notch 10, the pin and slot sliding and pivotal connection of the slide bar 12 allowing the same to be properly displaced when the parts are moved.

From the foregoing description it is believed that the construction and operation as well as the advantages of the present invention will be readily understood and appreciated by those skilled in the art.

Minor changes may be made in the invention without departing from the spirit and scope thereof as claimed.

What is claimed as new is:—

An animal catching device comprising a hook-shaped handle member, an animal leg receiving notch in the hook portion thereof, means engageable with the animal's leg and operated by the latter upon the exertion of a pull upon the handle member for directing the animal's leg into said notch and for closing the entrance to said notch after the animal's leg has been directed thereinto, said means involving a substantially bell-crank shaped member having an arm engageable with the animal's leg and another arm adapted to form a closure for the notch, the said member being pivotally mounted upon the hooked end of the handle and between the said animal leg receiving notch and the outer end of the said hook, said pivoted member having means for automatically returning it to its normal operative position immediately upon ceasing the pull upon the handle member, said pivoted member having a slide rod pivotally attached at one end to its first named arm, said rod being slidably and pivotally connected to said handle member, said sliding and pivoting connection being in alinement with the pivot for the said bell-crank member to facilitate the alining of the slide rod and one arm of the said bell crank member across the entrance to the hook-shaped member when the device is in its normal operative position.

In testimony whereof I affix my signature.

JOHN BOLF.